US009036322B2

(12) United States Patent
Green

(10) Patent No.: US 9,036,322 B2
(45) **Date of Patent: *May 19, 2015**

(54) APPARATUS FOR THE ABSORPTION, CONVERSION AND DETECTION OF ELECTROMAGNETIC ENERGY

(76) Inventor: Richard Douglas Green, Portland, OR (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/609,255

(22) Filed: Sep. 11, 2012

(65) Prior Publication Data

US 2013/0242454 A1 Sep. 19, 2013

Related U.S. Application Data

(63) Continuation of application No. 12/718,954, filed on Mar. 6, 2010, now Pat. No. 8,264,811.

(51) Int. Cl.

| | |
|---|---|
| ***H02H 1/00*** | (2006.01) |
| ***H02H 1/04*** | (2006.01) |
| ***H02H 3/22*** | (2006.01) |
| ***H05F 3/00*** | (2006.01) |
| ***H01T 23/00*** | (2006.01) |

(52) U.S. Cl.
CPC . *H05F 3/00* (2013.01); *H01T 23/00* (2013.01)

(58) Field of Classification Search
USPC .......................................................... 361/212
See application file for complete search history.

(56) References Cited

U.S. PATENT DOCUMENTS 8,264,811 B1 * 9/2012 Green ........................... 361/212

* cited by examiner

*Primary Examiner* — Dharti Patel

(57) ABSTRACT

An apparatus for the absorption, conversion and detection of electromagnetic energy without the need for an earth ground or atmosphere. This apparatus has three major parts: a collector stage, a conversion stage, and an emissive stage. The collection stage, an apparatus that can carry electromagnetic energy from the environment external to the apparatus, is connected electrically to the conversion stage, which comprises one or more layers of a material that can carry an electrical charge, disposed among two or more layers of a material that can carry an electrical charge, which layers are in turn connected electrically to components so as to trap the electromagnetic energy in an electromagnetic field and convert it into electrical energy. Finally, the electrical output of the conversion stage is electrically connected to an emissive stage: comprising an amplification circuit, transducing device or circuit capable of utilizing the energy.

19 Claims, 6 Drawing Sheets

Section 2-2

Section 3-3

Section 4-4

Section 5-5

Section 6-6

APPARATUS FOR THE ABSORPTION, CONVERSION AND DETECTION OF ELECTROMAGNETIC ENERGY

This is a continuation-in-part of application Ser. No. 12/718,954, filed Mar. 6, 2010, now U.S. Pat. No. 8,264,811, granted Sep. 11, 2012.

FIELD OF THE INVENTION

The present invention relates to the absorption and conversion of electromagnetic fields and a means by which these may be detected, dissipated or discharged without the need for an earth ground or atmosphere.

BACKGROUND OF THE INVENTION

Over the last century, there have been many solutions with regard to the grounding of radio aerials and antennas directly or indirectly to an earth ground. Earth grounding has been used in the circuitry of radios since their earliest manifestations. A ground-plane vertical antenna uses the earth as one-half of its dipole. So-called counterpoise grounds are often used when the resistance of the earth is too high to perform as an effective ground. This type of antenna ground is usually a star-shaped array of wires protruding from the support mast of the antenna in a plane normal to the antenna. These act as one plate of a capacitor, with the earth being the other plate, allowing for more efficient trans mission of RF waves into the earth.

Many solutions also exist with regard to electromagnetic sensors that are capable of detecting weak electromagnetic fields. Such EM sensors are used in many disciplines for testing, experimentation, and commercial analysis. Detection of electromagnetic emissions is important for testing the sensitivity of electronic equipment. It also allows for remote sensing of very weak electrical signals, such as those produced by the human body.

Random electromagnetic emissions from radio-frequency devices such as radios and radar arrays present the hazard of premature detonation of solid propellants, pyrotechnics and explosive charges (also known as Electro-Explosive Devices, or EEDs), detonation of volatile materials and harm to humans. These dangers are generally classified as: Hazards of Electro-magnetic Radiation to Ordnance (HERO), Hazards of Electromagnetic Radiation to Fuel (HERF) and Hazards of Electromagnetic Radiation to Personnel (HERP), Electromagnetic Interference (EMI), Electromagnetic Vulnerability (EMV), Electromagnetic Pulse (EMP) and electrostatic Discharge (ESD) (viz., NAVINST 9700.2, and NAVFACINST 11010.45). In addition to these hazards, military field radios are susceptible to damage from EMI. Aircraft avionics have to be specially shielded to protect them from EMI. Standards and procedures have been developed over time for the protection of ordnance and volatile materials to avoid premature detonation or other malfunction (viz., MIL-STD-464C and USAF ISR Agency Instruction 33-501).

This invention describes an apparatus by which electromagnetic energy can be absorbed, converted, detected, used or dissipated without the need for an earth ground or atmosphere. This invention provides an artificial ground, and can act as a replacement for an earth ground and which when connected to control and amplifier circuitry allows for the detection of EM waves.

SUMMARY OF THE INVENTION

There are three major sections to this apparatus: the collection section (or stage), the conversion section (or stage), and the emissive section (or stage). The collector section comprises an apparatus capable of carrying a electrical charge and sensitive to electromagnetic energy, and is electrically connected to an external device such as an antenna. The collection stage is connected electrically to a central layer comprised of one or more plates or meshes also capable of carrying an electrical charge, which are disposed between (but without touching) two or more outer layers of plates or meshes, each capable of carrying electrical charge, which are in turn connected electrically to components and circuits which can trap the electrical charges and convert them into electrical current. The center layers of plates or meshes, the outer layers of plates or meshes and certain electrical components make up the conversion section of the apparatus. Finally, the electrical output of the conversion section is electrically connected either directly or inductively to a device or circuit capable of using the voltage and current produced in the conversion section to be amplified for detection, or to emit other forms of energy (such as light, sound or heat). This last portion is the emissive section of the apparatus. A signal source may also be attached, to provide a waveform and create an oscillating electrical field in the apparatus.

Accordingly, several advantages include that this apparatus works without the need for bonding to an earth ground or a need for atmosphere to bleed off excess charge. It also is capable of detecting, absorbing and dissipating electromagnetic fields. Further advantages will become apparent from a study of the following description and the accompanying drawings.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
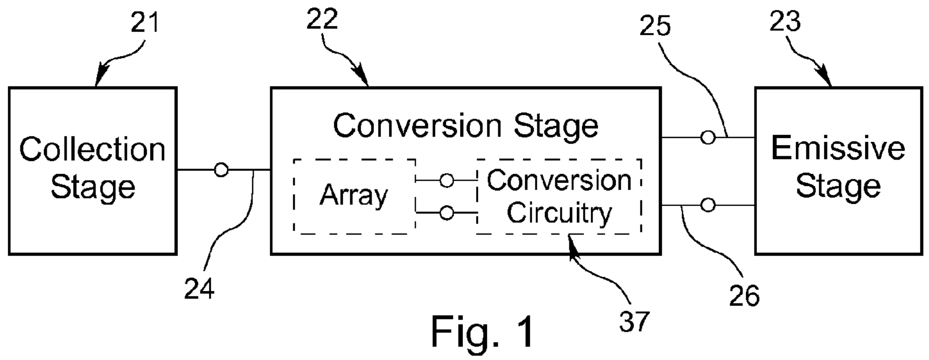
FIG. 1 is a block diagram view of the three major sections of the apparatus.

FIG. 1 is a block diagram of the three sections of the apparatus: the collector stage 21, the conversion stage 22, and the emissive stage 23. It illustrates how the collector stage 21 is connected to the conversion stage 22 by the collector 27-to-grid connection, and how the conversion stage 22 is connected to the emissive stage 23 by the anode-to-emitter connection 25 and the cathode-to-emitter connection 26. The collector stage 21 is electrically connected to the source of the electrical charges or charged charges through bonding to the external environment. The conversion stage 22 comprises two sub-stages. First, an array sub-stage, arranged as a series of one or more center layers about which are disposed one or more outer layers that entrain charged particles. These outer layers are in turn electrically connected to the second sub-stage, the conversion circuitry sub-stage 37, comprising electrical components that convert the entrained charges into usable current. Finally, the emissive stage 23, electrically connected to the conversion circuitry 37, allows for the charges to be converted into other forms of energy, for signal processing, or used as electrical energy.

Figure 2:
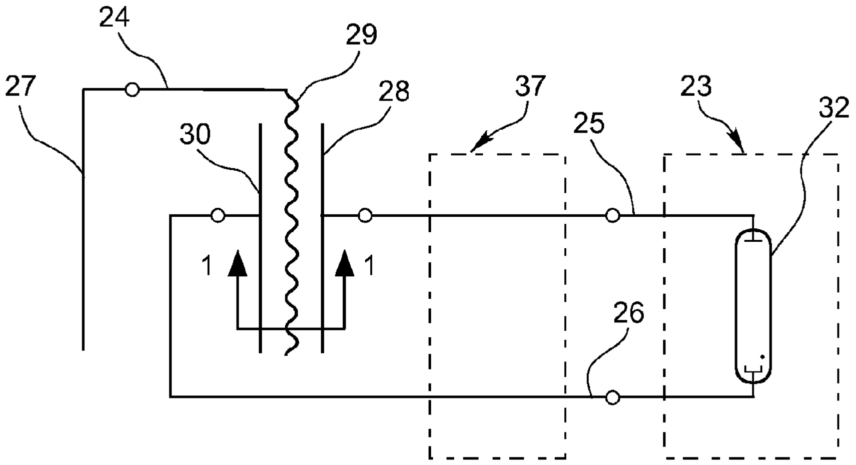
FIG. 2 is a circuit view of an embodiment of the apparatus, which illustrates the electrical relationships among the major components of the apparatus, and showing a gas discharge tube in the emissive stage.

FIG. 2 is an electrical circuit diagram of one embodiment of the apparatus. The collector 27, capable of carrying electric charge, is electrically connected to the source of the electrical charges or charged charges, and is in turn electrically connected to the center layer of the array sub-stage, a conductive grid(s) (which may be one or more meshes or plates), also capable of carrying electric charge, by the collector 27-*to*-grid connection 24. The center layer(s) 29—in one embodiment, a mesh—is disposed between one or more anode layer(s) 28, as plate(s) (or meshes) capable of carrying electric charge, and one or more cathode layer(s) 30, as plate(s) (or meshes) also capable of carrying electric charge. Between the center grid(s) and the anode plate(s) are disposed one or more anode dielectric layers, and between the center grid(s) and the cathode layer(s) 30 are disposed one or more cathode dielectric layers. These dielectric layers may comprise air, vacuum, or other material. The cathode plate(s) and anode plate(s) may be electrically connected to the conversion circuitry sub-stage 37 arranged such that the current generated will flow in one direction. A power supply 36 (not shown) and other electrical components (such as capacitors) may be inserted to provide a bias and maintain an electric field between the anode plate(s) and cathode plate(s). Finally, the anode-to-emitter connection 25 and cathode-to-emitter connection 26 are electrically connected to the emissive stage 32, which may be such devices and associated circuitry as a flash tube, gas discharge tube, light-emitting diode, piezoelectric device, or other transducing device which can convert electrical energy into another form of energy. This emissive stage may also comprise signal processing circuitry for the detection of waveforms and current flow induced in the collector by electromagnetic fields. The number of grids and plates, their area, the distance between them and the thickness of the dielectrics will depend upon the charge to be captured and converted and its characteristics.

Figure 3A:
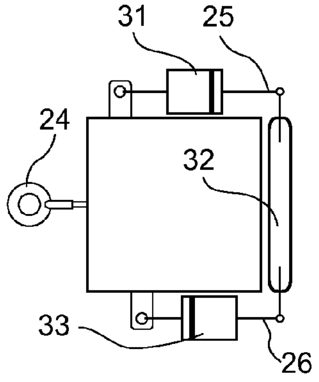
FIG. 3*a* is a top plan view of an embodiment of the apparatus, illustrating the physical relationships among the components.

FIG. 3*a* is a plan view of an embodiment of the apparatus, showing the physical relationships among the components, namely the collector-to-array sub-stage connection 24, the package of the array of grids and plates in the array sub-stage, the anode layer diode 31, the cathode layer diode 33, and a gas discharge tube as the emissive device 32. The connector 24 is used to provide an electrical connection to the environment external to the apparatus.

Figure 3B:
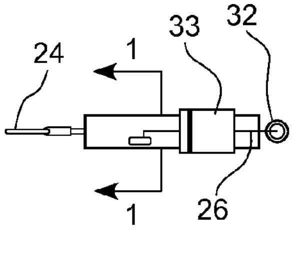
FIG. 3*b* is a side elevation view of the embodiment of the apparatus in FIG. 3*a*, illustrating the physical relationships among the components.

FIG. 3*b* is a side elevation of the embodiment of FIG. 3*a*, also showing the physical relationships among the components.

Figure 3C:
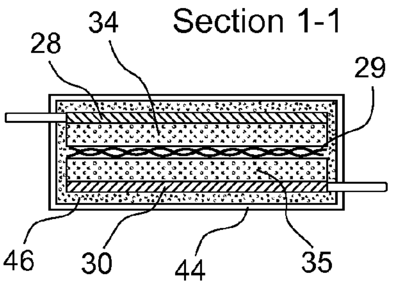
FIG. 3*c* is a section view of the embodiment shown in FIG. 3*a*, illustrating the layers of the array sub-stage.

FIG. 3*c* (Section 1-1) is a cross-section of the embodiment of FIG. 3*a* through the array sub-stage of the apparatus. It illustrates how the center grid(s) is/are disposed between the anode plate(s) and the cathode plate(s) without touching either. It also illustrates how the anode dielectric layer(s) 34 are disposed between the center grid(s) and the anode plate(s) and the cathode dielectric layer(s) 35 are disposed between the center grid(s) and the cathode plate(s). Illustrated also is a dielectric layer around the array and a protective coating 44 applied around the outer surface.

Figure 4:
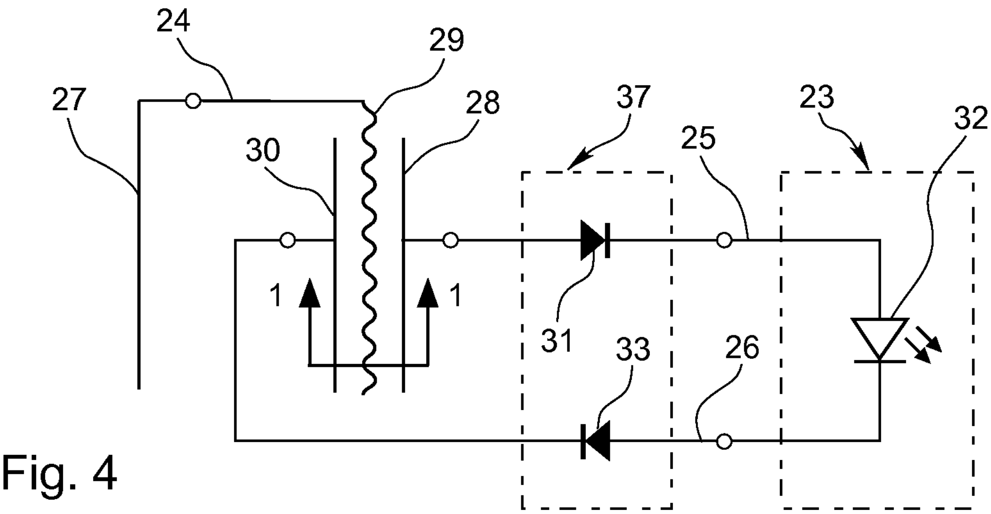
FIG. 4 is a circuit view of an embodiment of the apparatus that illustrates diodes in the conversion circuitry sub-stage and a light-emitting diode as the emissive device.

FIG. 4 is an electrical circuit diagram of another embodiment of the apparatus of FIG. 2, to which diodes have been added as the conversion circuitry 37. In addition, it illustrates the use of a light-emitting diode as the emissive device 32.

Figure 5:
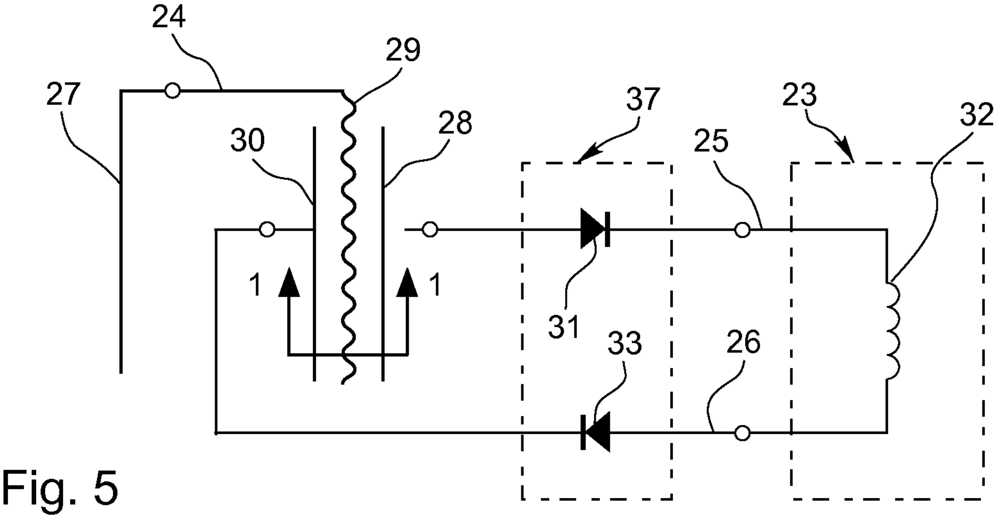
FIG. 5 is a circuit view of an embodiment of the apparatus that illustrates diodes in the conversion circuitry sub-stage and an inductor which can drive other circuitry as the emissive device.

FIG. 5 is an electrical circuit diagram of another embodiment of the apparatus of FIG. 4, to which an inductor which can drive other circuitry has been added as the emissive stage 32.

Figure 6:
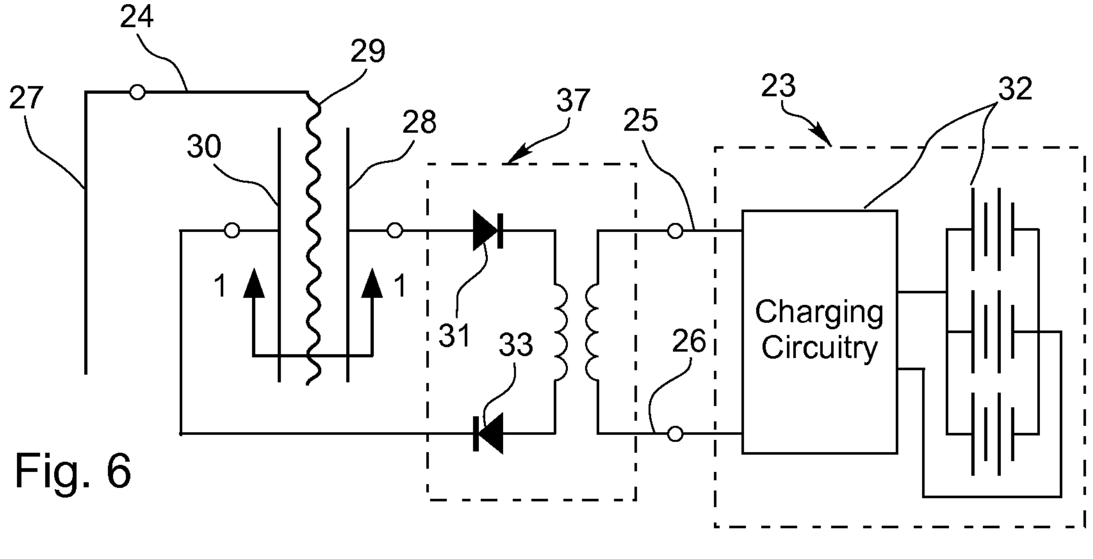
FIG. 6 is a circuit view of an embodiment of the apparatus, illustrating a charging system as the emissive stage.

FIG. 6 is an electrical circuit diagram of another embodiment of the apparatus of FIG. 4, illustrating the application of charging circuitry and batteries as the emissive devices.

Figure 7:
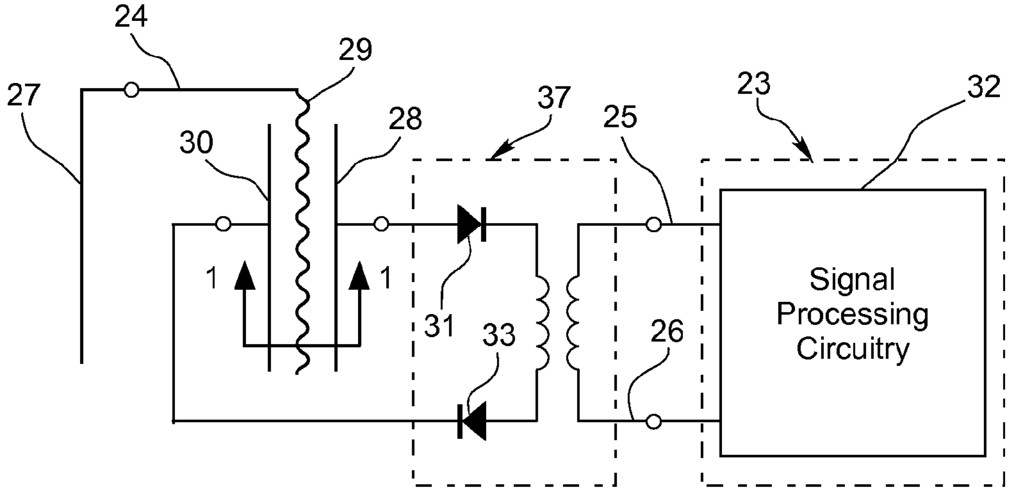
FIG. 7 is a circuit view of an embodiment of the apparatus, illustrating signal processing circuitry which can provide a reference frequency as the emissive stage.

FIG. 7 is an electrical circuit diagram of an embodiment of the apparatus, showing signal processing circuitry as the emissive device 32.

Figure 8A:
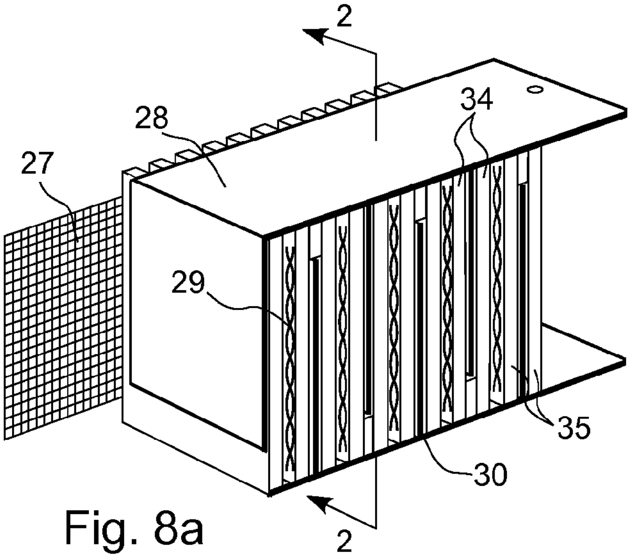
FIG. 8*a* is a perspective view of an embodiment of part of the conversion section of the apparatus, illustrating a number of center layers disposed between a number of anode and cathode layers.

FIG. 8*a* illustrates one embodiment of the apparatus, showing the physical relationships among the components, namely the array sub-system in the conversion stage 22. It illustrates the package of the array of grids and plates and the several dielectric layers.

Figure 8B:
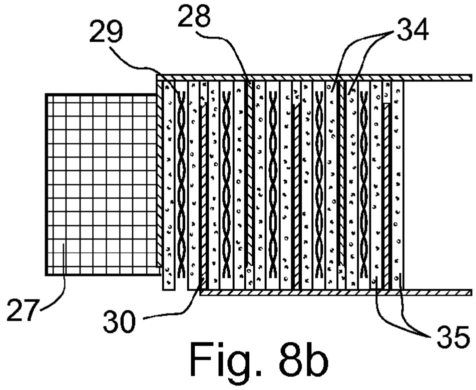
FIG. 8*b* is a section view of the embodiment shown in FIG. 8*a;*

FIG. 8*b* (Section 2-2) is a cross-section of the embodiment in FIG. 8*a*.

Figure 9:
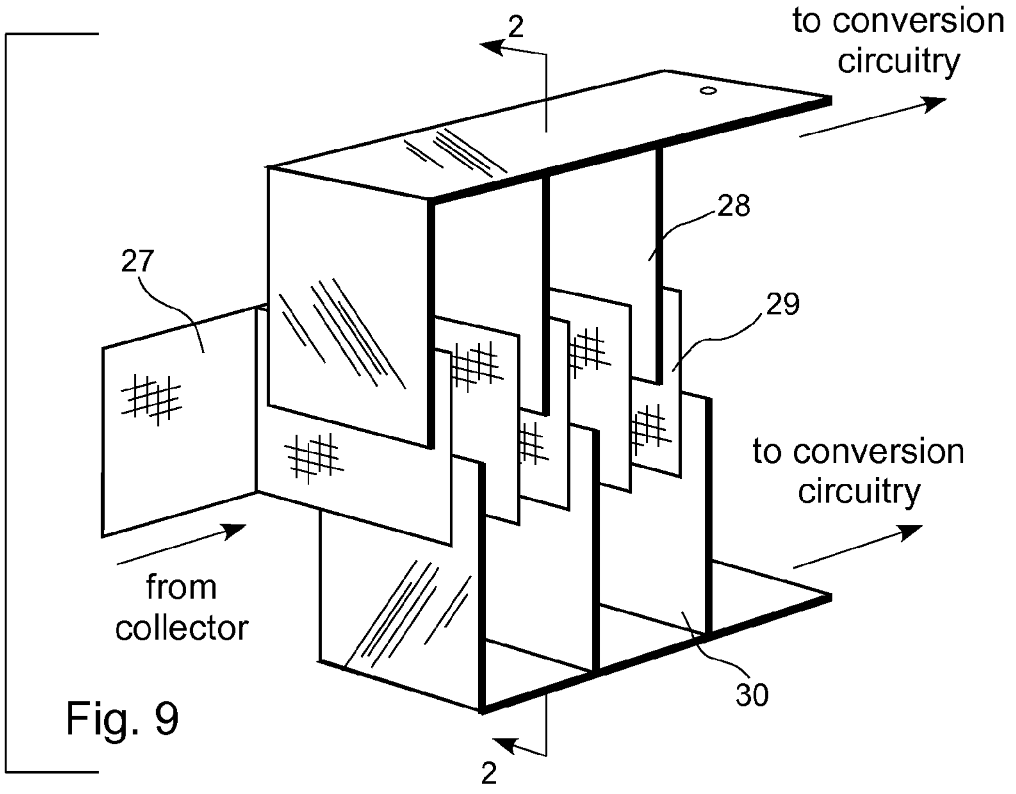
FIG. 9 is an exploded view of an embodiment of part of the conversion array sub-stage of the invention shown in FIG. 8*a*, illustrating multiple center layers disposed among multiple anode and cathode layers (for the sake of clarity, the dielectric layers are not shown)

FIG. 9 is an exploded perspective mechanical view of one embodiment of the array sub-stage of the apparatus, illustrating how multiple center grids or plates are disposed between multiple anode grids or plates and cathode grids or plates. For the sake of clarity, the dielectric layers are not shown.

Figure 10A:
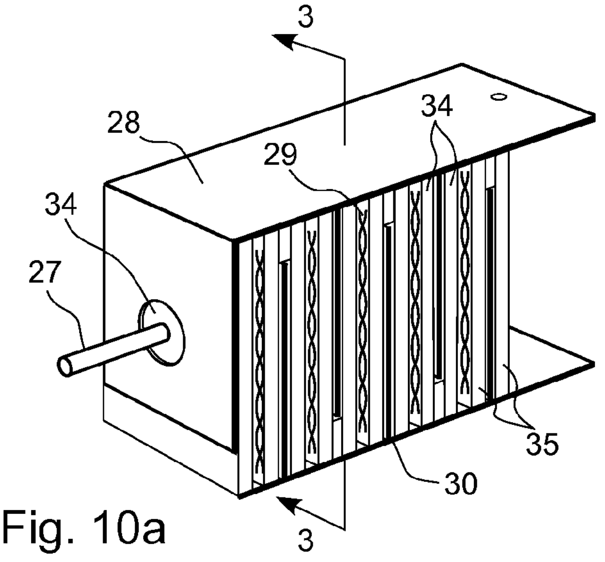
FIG. 10*a* is a perspective view of an embodiment of part of the conversion array sub-stage of the invention, shown in FIG. 9, illustrating the center array layers connected to a rod or wire that is disposed coaxially.

FIG. 10*a* illustrates an embodiment of the apparatus, similar to the array sub-stage illustrated in FIG. 8*a*. However, rather than the center layer grid are connected to a rod mounted co-axially, and this provide the collector-to-array connection 24.

Figure 10B:
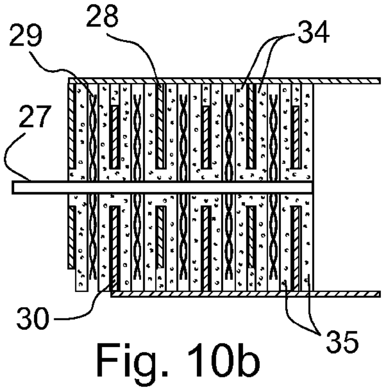
FIG. 10*b* is a section view of the embodiment shown in FIG. 10*a*, illustrating the center array layers connected to a rod or wire that is disposed coaxially.

FIG. 10*b* (Section 3-3) is a cross-section of the embodiment in FIG. 10*a*.

Figure 11:
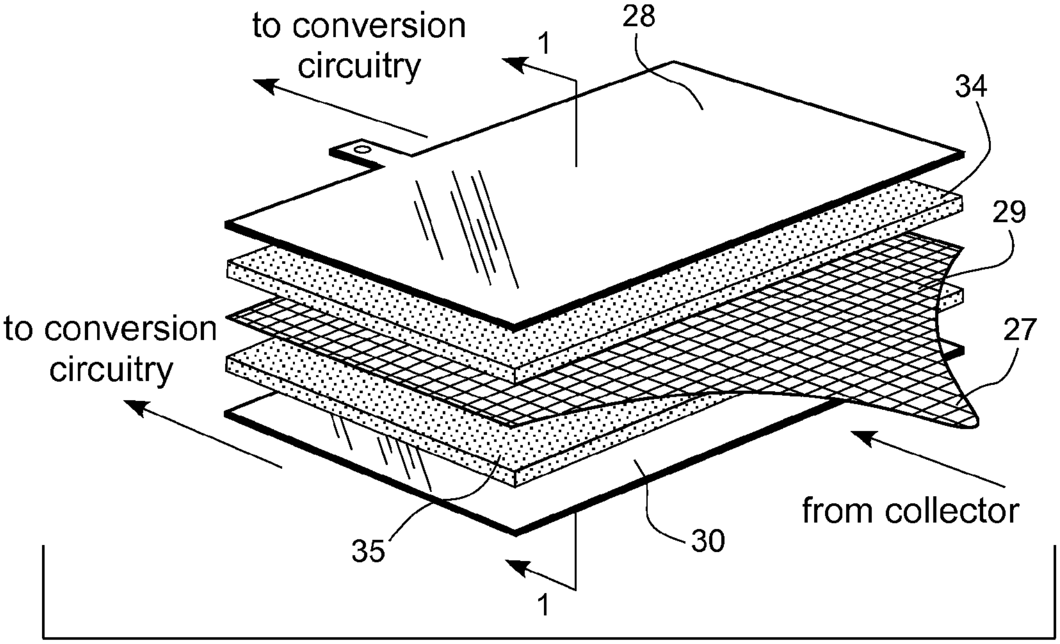
FIG. 11 is a perspective view of an embodiment of part of the conversion array sub-stage of the apparatus, illustrating a single center layer disposed between a single anode layer and a single cathode layer, with their respective dielectric layers between the center layer and the outer layers, and tabs to allow electrical connection to the rest of the apparatus.

FIG. 11 is an exploded perspective mechanical view of another embodiment of part of the array sub-stage of the apparatus, illustrating a center grid(s) disposed between the anode plate(s) and the cathode plate(s), illustrating the sandwiching of the layers and tabs to allow electrical connections.

Figure 12:
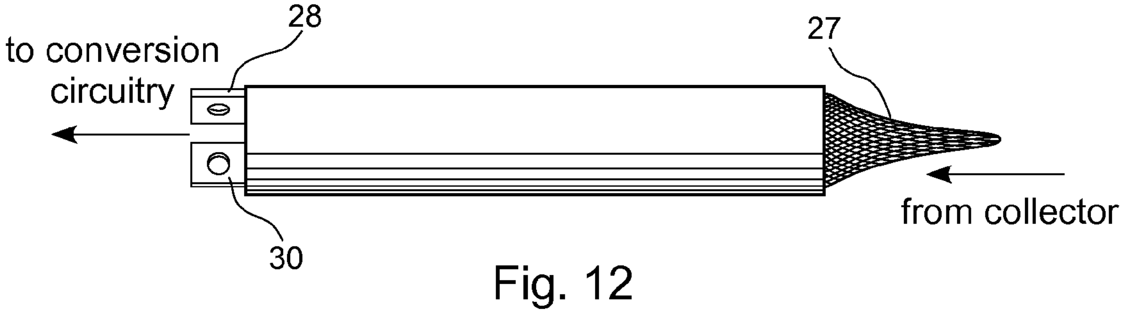
FIG. 12 is a side elevation view of the embodiment shown in FIG. 11, in which the array has been rolled into a cylinder, and the tabs for the anode and cathode plates are shown on the conversion end and the center grid has been rolled and twisted into a point on the collector end.

FIG. 12 is a side mechanical view of the array sub-stage of the embodiment illustrated in FIG. 11, illustrating the sandwich of grids and plates and dielectrics rolled into a cylinder, with the tabs for connection to the conversion circuitry 37 on the left and the grid arranged for connecting to the collector 27 on the right.

Figure 13A:
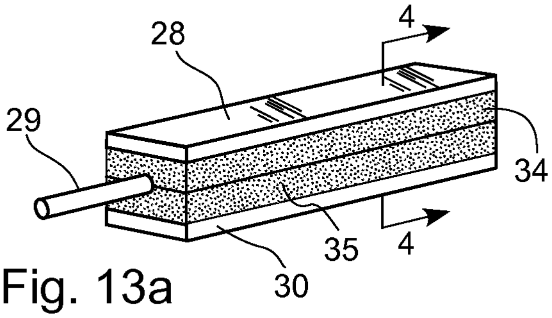
FIG. 13*a* is a perspective view of an embodiment of part of the conversion array sub-stage in which the array is in a rectangular configuration, with the center layer replaced by a rod or wire, with an anode layer disposed on one side of the rod or wire, and a cathode layer disposed on the opposite side of the rod or wire.

FIG. 13*a* is a perspective mechanical view of another embodiment of the conversion array sub-stage of the apparatus, showing a co-axially mounted wire instead of a grid as the center layer, with one anode plate and one cathode plate disposed on either side of the wire.

Figure 13B:
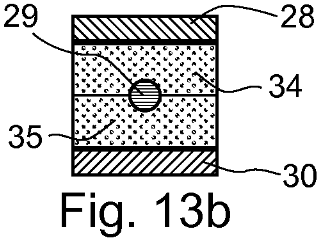
FIG. 13*b* is a cross-section of the embodiment in FIG. 13*a;*

FIG. 13*b* is a cross-section of the embodiment of 13*a*.

Figure 14A:
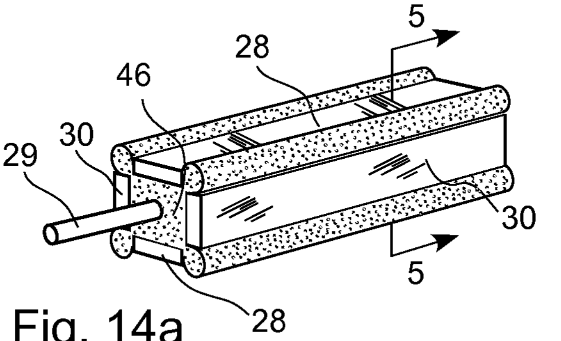
FIG. 14*a* is a perspective view of an embodiment of part of the conversion array sub-stage of the invention, in which the array is in a rectangular configuration, with the center layer replaced by a rod or wire, with two anode plates disposed on either side of the wire, and two cathode plates disposed at ninety degrees to the anode plates, also illustrating the use of a common dielectric.

FIG. 14*a* is a perspective mechanical view of another embodiment of the conversion array sub-stage of the apparatus, showing a wire instead of a grid as the center layer, with two anode plates disposed on opposite sides of the wire, and two cathode plates disposed at ninety degrees to the anode plates. It also illustrates the use of a common dielectric 46.

Figure 14B:
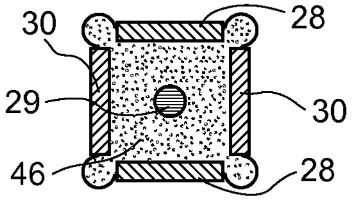
FIG. 14*b* is a cross-section of the embodiment of 14*a;*

FIG. 14*b* is a cross-section of the embodiment of 14*a*.

Figure 15A:
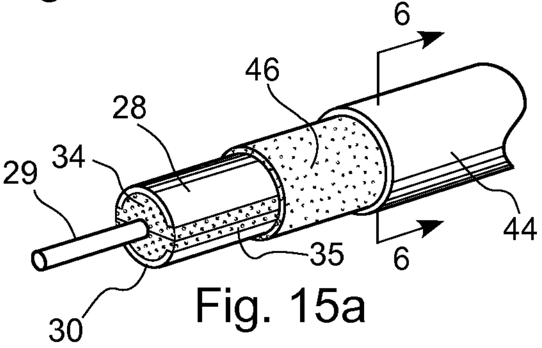
FIG. 15*a* is a perspective cutaway view of an embodiment of part of the conversion array sub-stage of the invention, similar in form to coaxial cabling, with a wire instead of a grid as the center layer(s) 29, and the anode and cathode plates disposed co-axially on either side of the center wire.

FIG. 15*a* is a perspective mechanical view of another embodiment of the conversion array sub-stage of the apparatus, designed like cabling, with a wire instead of a grid as the center layer(s) 29, and the anode and cathode plates disposed co-axially on either side of the center wire. It also illustrates the use of a protective layer 44.

Figure 15B:
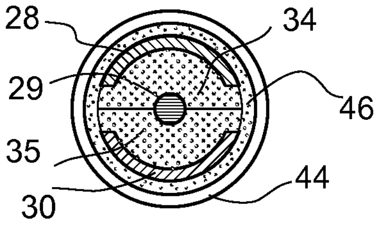
FIG. 15*b* is a cross-section of the embodiment of 15*a;*

FIG. 15*b* is a cross-section of the embodiment of 15*a*

Figure 16A:
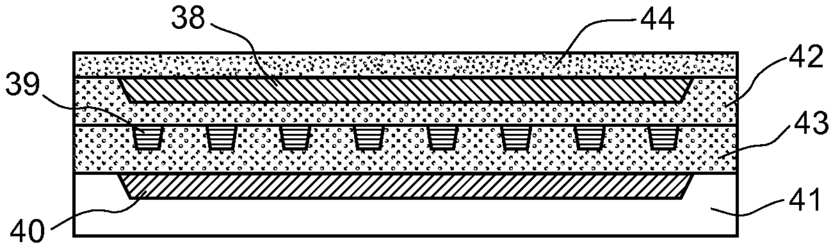
FIG. 16*a* is a cross-section through a semiconductor embodiment of part of the conversion array sub-stage of the invention, illustrating the center deposition layer disposed between the anode deposition layer(s), and the cathode deposition layer(s), which are disposed atop a base layer. It also illustrates the dielectric anode and cathode deposition layer(s) disposed between the anode, center, and cathode deposition layers. It also illustrates a protective layer disposed atop the anode layer.

FIG. 16*a* is a cross-section through a semiconductor embodiment of the conversion array sub-stage of the apparatus, illustrating an anode deposition layer(s) 38, a center deposition layer(s) 39, and a cathode deposition layer(s) 40, atop the base layer 41. It also illustrates an anode dielectric deposition layer(s) 42, and a cathode dielectric deposition layer(s) 43, as well as a protective layer 44.

Figure 16B:
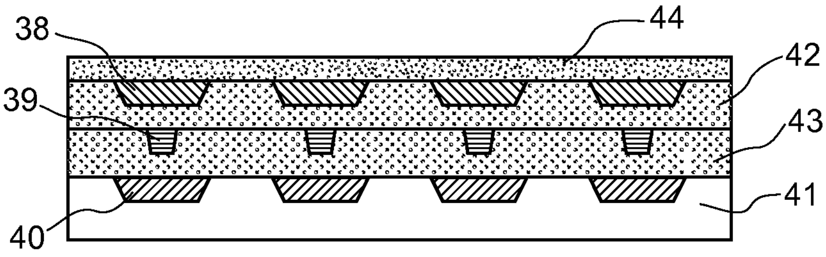
FIG. 16*b* is a cross-section through another semiconductor embodiment of the apparatus, similar to that of FIG. 16*a*, but illustrating multiple anode and cathode pads.

FIG. 16*b* is a cross-section through a semiconductor embodiment of the apparatus, similar to that of FIG. 16*a*, with multiple anode and cathode pads.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for the absorption, detection and dissipation of electromagnetic energy without the need for an earth ground or atmosphere, comprising:

means for collecting electromagnetic radiation;

means for entraining excited charges in an electromagnetic field and converting the charges into electrical energy, electrically connected to said means for collecting electromagnetic radiation;

means for using the converted excited charges to provide waveforms or current to an emitting device or circuit that makes the electrical energy usable or converts the electrical energy to another form, such as light or sound, electrically connected to said means for entraining the excited charges in an electromagnetic field and converting the charges into electrical energy;

means for an electrical connection between the collector(s) and the center layer in the conversion sub-stage;

means for an electrical connection between the anode layers(s) and the emissive stage;

means for an electrical connection between the cathode layer(s) and the emissive stage;

means for an apparatus for excited charges to be collected, electrically connected to said means for an electrical connection between the collector(s) and the center layer in the conversion sub-stage;

means for entraining the excited charges;

means for an area for the excited charges to collect and be attracted to one of the outer layers for conversion to current, electrostatically coupled to said means for entraining the excited charges, and electrically connected to said means for an electrical connection between the collector(s) and the center layer in the conversion sub-stage;

means for entraining the excited charges, electrostatically coupled to said means for an area for the excited charges to collect and be attracted to one of the outer layers for conversion to current, and electrostatically coupled to said means for entraining the excited charges;

means for control of the flow of current from the anode layer(s), electrically connected to said means for entraining the excited charges;

means for conversion and emission of electrical current, electrically connected to said means for control of the flow of current from the anode layer(s);

means for control of the flow of current to the cathode layer(s), electrically connected to said means for conversion and emission of electrical current as another form of energy, and electrically connected to said means for entraining the excited charges;

means for a layer to isolate the anode layer(s) from the center layer(s), adjacently placed to said means for an area for the excited charges to collect and be attracted to one of the outer layers for conversion to current, and adjacently placed to said means for entraining the excited charges;

means for a layer to isolate the cathode layer(s) from the center layer(s), adjacently placed to said means for entraining the excited charges, and adjacently placed to said means for an area for the excited charges to collect and be attracted to one of the outer layers for conversion to current; and means for converting the charges entrained into electrical energy.

2. The apparatus for the absorption, detection and dissipation of electromagnetic energy in accordance with claim 1, wherein said means for collecting excited charges comprises a collector stage.

3. The apparatus for the absorption, detection and dissipation of electromagnetic energy in accordance with claim 1, wherein said means for entraining the excited charges in an electromagnetic field and converting the charges into electrical energy comprises a conversion stage.

4. The apparatus for the absorption, detection and dissipation of electromagnetic energy in accordance with claim 1, wherein said means for using the converted excited charges to provide power to an emitting device that converts the electrical energy to another form, such as light or sound, or to a detector comprises an emissive stage.

5. The apparatus for the absorption, detection and dissipation of electromagnetic energy in accordance with claim 1, wherein said means for an electrical connection between the collector(s) and the center layer in the conversion sub-stage comprises a collector-to-array connection.

6. The apparatus for the absorption, detection and dissipation of electromagnetic energy in accordance with claim 1, wherein said means for an electrical connection between the anode layers(s) and the emissive stage comprises an anode-to-emitter connection.

7. The apparatus for the absorption, detection and dissipation of electromagnetic energy in accordance with claim 1, wherein said means for an electrical connection between the cathode layer(s) and the emissive stage comprises a cathode-to-emitter connection.

8. The apparatus for the absorption, detection and dissipation of electromagnetic energy in accordance with claim 1, wherein said means for an apparatus for excited charges to be collected comprises a collector.

9. The apparatus for the absorption, detection and dissipation of electromagnetic energy in accordance with claim 1, wherein said means for entraining the excited charges comprises an anode layer(s).

10. The apparatus for the absorption, detection and dissipation of electromagnetic energy in accordance with claim 1, wherein said means for an area for the excited charges to collect and be attracted to one of the outer layers for conversion to current comprises a center layer(s).

11. The apparatus for the absorption, detection and dissipation of electromagnetic energy in accordance with claim 1, wherein said means for entraining the excited charges comprises a cathode layer(s).

12. The apparatus for the absorption, detection and dissipation of electromagnetic energy in accordance with claim 1, wherein said means for control of the flow of current from the anode layer(s) comprises an anode layer diode.

13. The apparatus for the absorption, detection and dissipation of electromagnetic energy in accordance with claim 1, wherein said means for conversion and emission of electrical current as another form of energy comprises a light-emitting diode, laser, piezoelectric crystal, flash tube, or other circuit emissive device such as an amplifying circuit or detection circuit.

14. The apparatus for the absorption, detection and dissipation of electromagnetic energy in accordance with claim 1, wherein said means for control of the flow of current to the cathode layer(s) comprises a cathode layer diode.

15. The apparatus for the absorption, detection and dissipation of electromagnetic energy in accordance with claim 1, wherein said means for a layer to isolate the anode layer(s) from the center layer(s) comprises an anode dielectric layer(s).

16. The apparatus for the absorption, detection and dissipation of electromagnetic energy in accordance with claim 1, wherein said means for a layer to isolate the cathode layer(s) from the center layer(s) comprises a cathode dielectric layer(s).

17. The apparatus for the absorption, detection and dissipation of electromagnetic energy in accordance with claim 1, wherein said means for converting the excited charges entrained into electrical energy comprises a conversion circuitry.

18. An apparatus for the absorption, detection and dissipation of electromagnetic energy without the need for an earth ground or atmosphere, comprising:

a collector stage, for absorbing electromagnetic energy;

a conversion stage, for entraining charges excited by the absorbed electromagnetic energy in an electromagnetic field and converting the charges into electrical energy, electrically connected to said collector stage;

an emissive stage, for using the converted excited charges to provide power to an emitting device that converts the electrical energy to another form, such as light or sound, electrically connected to said conversion stage;

a collector-to-array connection, for an electrical connection between the collector(s) and the center layer in the conversion sub-stage;

an anode-to-emitter connection, for an electrical connection between the anode layers(s) and the emissive stage;

a cathode-to-emitter connection, for an electrical connection between the cathode layer(s) and the emissive stage;

a collector, for an apparatus for electrically charged charges to be collected, electrically connected to said collector-to-array connection;

an anode layer(s), for entraining the excited charges;

a center layer(s), for an area for the excited charges to collect and be attracted to one of the outer layers for conversion to current, electrostatically coupled to said anode layer(s), and electrically connected to said collector-to-array connection;

a cathode layer(s), for entraining the excited charges, electrostatically coupled to said center layer(s), and electrostatically coupled to said anode layer(s);

an anode layer diode, for control of the flow of current from the anode layer(s), electrically connected to said anode layer(s);

a light-emitting diode, laser, piezoelectric crystal, flash tube, or other circuit emissive device, such as an amplifying circuit, for conversion and emission of electrical current as another form of energy, electrically connected to said anode layer diode;

a cathode layer diode, for control of the flow of current to the cathode layer(s), electrically connected to said emissive device, and electrically connected to said cathode layer(s);

a light-emitting diode, laser, piezoelectric crystal, flash tube, or other circuit emissive device, such as an amplifying circuit, for conversion and emission of electrical current as another form of energy, electrically connected to said cathode layer diode;

an anode dielectric layer(s), for a layer to isolate the anode layer(s) from the center layer(s), adjacently placed to said center layer(s), and adjacently placed to said anode layer(s);

a cathode dielectric layer(s), for a layer to isolate the cathode layer(s) from the center layer(s), adjacently placed to said cathode layer(s), and adjacently placed to said center layer(s); and a conversion circuitry, for converting the excited charges entrained into electrical energy.

19. An apparatus for the absorption, detection and dissipation of electromagnetic energy without the need for an earth ground or atmosphere, comprising:

a collector stage, for collecting electromagnetic energy;

a conversion stage, for entraining the electromagnetic energy in an electromagnetic field and converting the excited charges into electrical energy, electrically connected to said collector stage;

an emissive stage, for using the converted electromagnetic energy to provide power to an emitting device that converts the electrical energy to another form, such as light or sound, electrically connected to said conversion stage;

a collector-to-array connection, for an electrical connection between the collector(s) and the center layer in the conversion sub-stage;

an anode-to-emitter connection, for an electrical connection between the anode layers(s) and the emissive stage;

a cathode-to-emitter connection, for an electrical connection between the cathode layer(s) and the emissive stage;

a collector, for an apparatus for excited charges to be collected, electrically connected to said collector-to-array connection;

an anode layer(s), for entraining the excited charges;

a center layer(s), for an area for the excited charges to collect and be attracted to one of the outer layers for conversion to current, electrostatically coupled to said anode layer(s), and electrically connected to said collector-to-array connection;

a cathode layer(s), for entraining the excited charges, electrostatically coupled to said center layer(s), and electrostatically coupled to said anode layer(s);

an anode layer diode, for control of the flow of current from the anode layer(s), electrically connected to said anode layer(s);

a detection circuitry, by which the entrained and converted charges may be analyzed and used, electrically connected to said cathode layer diode;

a cathode layer diode, for control of the flow of current to the cathode layer(s), electrically connected to said emissive device, and electrically connected to said cathode layer(s);

a detection circuitry, by which the entrained and converted charges may be analyzed and used, electrically connected to said cathode layer diode;

an anode dielectric layer(s), for a layer to isolate the anode layer(s) from the center layer(s), adjacently placed to said center layer(s), and adjacently placed to said anode layer(s);

a cathode dielectric layer(s), for a layer to isolate the cathode layer(s) from the center layer(s), adjacently placed to said cathode layer(s), and adjacently placed to said center layer(s);

a frequency generating circuitry, for supplying the layer(s) with a comparator signal;

a conversion circuitry, for converting the charges entrained into electrical energy.

* * * * *